(12) United States Patent
Gengler et al.

(10) Patent No.: US 6,250,396 B1
(45) Date of Patent: Jun. 26, 2001

(54) METHOD AND APPARATUS FOR CONTROLLING A HITCH

(75) Inventors: Eric P. Gengler; Jeffrey M. Thate, both of Peoria, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 09/409,245

(22) Filed: Sep. 30, 1999

(51) Int. Cl.[7] ................................. A01B 63/112
(52) U.S. Cl. ....................... 172/7; 172/439; 701/50
(58) Field of Search ................... 172/439, 2, 7, 172/450, 677, 679, 680; 701/50

(56) References Cited

U.S. PATENT DOCUMENTS

| 4,268,057 | 5/1981 | Engelmann et al. | 280/474 |
|---|---|---|---|
| 4,304,303 | 12/1981 | Lange | 172/239 |
| 4,645,226 | 2/1987 | Gustavsson et al. | 280/423 |
| 4,837,691 | 6/1989 | Boe et al. | 364/424.05 |
| 4,852,657 | 8/1989 | Hardy et al. | 172/2 |
| 4,979,092 | 12/1990 | Bergene et al. | 364/148 |
| 5,012,415 | 4/1991 | Boe et al. | 364/424.07 |
| 5,143,159 | 9/1992 | Young et al. | 172/8 |
| 5,170,849 | 12/1992 | Nikkel et al. | 172/6 |
| 5,246,077 | 9/1993 | Tjaden et al. | 172/450 |
| 5,549,166 | 8/1996 | Orbach et al. | 172/4 |
| 5,697,454 | 12/1997 | Wilcox et al. | 172/447 |
| 5,823,270 | 10/1998 | Cooper | 172/439 |

FOREIGN PATENT DOCUMENTS 19611626A 11/1997 (DE).

*Primary Examiner*—Christopher J. Novosad
(74) *Attorney, Agent, or Firm*—Clifton G. Green

(57) ABSTRACT

A processing device for determining a position of a first member capable of movement in at least two axes. A first processing device receives a first member actual position along a first axis. The first processing device determines and transmits a first member limit position along a second axis as a function of the first member actual position along the first axis.

23 Claims, 3 Drawing Sheets

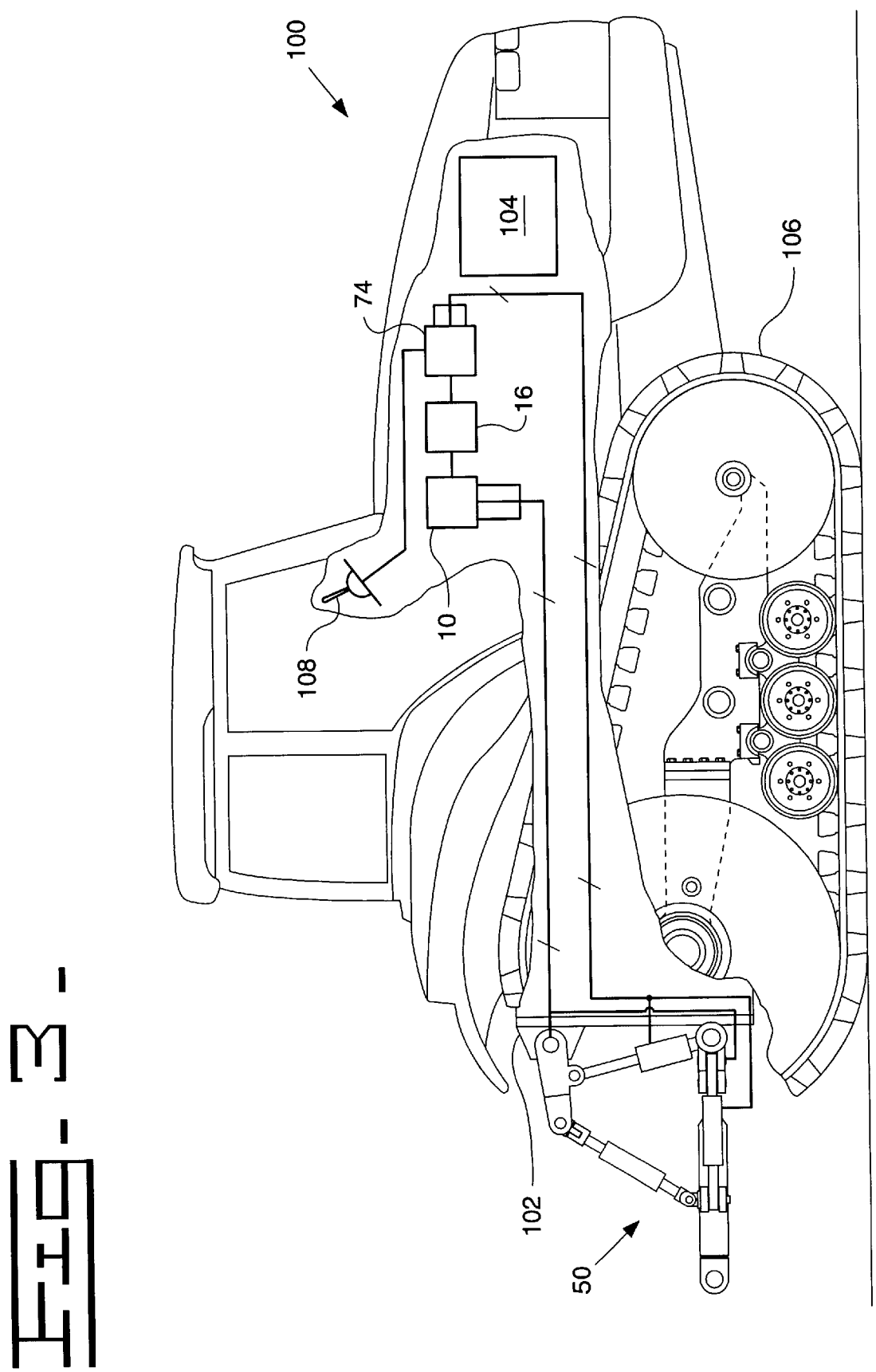

METHOD AND APPARATUS FOR CONTROLLING A HITCH

TECHNICAL FIELD

The present invention relates generally to the controlling of a member, and more specifically to a method and apparatus for controlling the position of an arm.

BACKGROUND ART

The agricultural and other industries routinely use hitches capable of movement in the horizontal and vertical directions. A work implement, such as a cultivator, is attached to a hitch, which is in turn attached to a work machine, such as a tractor. The horizontal movement of the hitch allows for articulation between the cultivator and the tractor. The vertical movement of the hitch allows for the cultivator to be raised out of and off the ground. This typically occurs when the tractor is traveling between fields or on a road.

As the hitch is raised, it is important to center the hitch relative to the tractor. If the hitch is not centered as it is raised, it will exert a torque that tends to urge the tractor into a roll. Although the torque is typically orders of magnitude less than the torque required to roll a tractor, the torque nonetheless makes the tractor less stable than if it were not present. In addition, when the hitch is off-center as it is raised, it may contact other components on the tractor, such as a power take off or implement valve stack, causing wear or damage.

In the past, mechanical guides, such as sway blocks, have been used to force the hitch toward center as it raises. The sway blocks form a physical barrier beyond which the hitch cannot travel. Sway blocks however, present several problems. For example, when the hitch encounters a sway block, significant rubbing between the hitch and sway block occurs. This wears both the hitch and sway block, causing the need for frequent repair and replacement of both pieces. In the past, conventional hitches were generally free moving, and do not experience significant problems with rubbing. However, many hitches today now hold the hitch hydraulically in a given position, even when being raised, thus causing the significant rubbing mentioned above. In addition, when hydraulic cylinders are used to move the hitch, the resistance of the sway blocks to the motion of the hitch can cause significant backpressure in the hydraulics.

DISCLOSURE OF THE INVENTION

The present invention provides apparatus and methods for determining a position of a first member capable of movement in at least two axes. A first processing device receives a first member actual position along a first axis. The first processing device determines and transmits a first member limit position along a second axis as a function of the first member actual position along the first axis.

BRIEF DESCRIPTION OF THE DRAWINGS

FIG. 3 is a functional block diagram and side view of a work machine according to one embodiment of the invention.

BEST MODE FOR CARRYING OUT THE INVENTION

Figure 1:
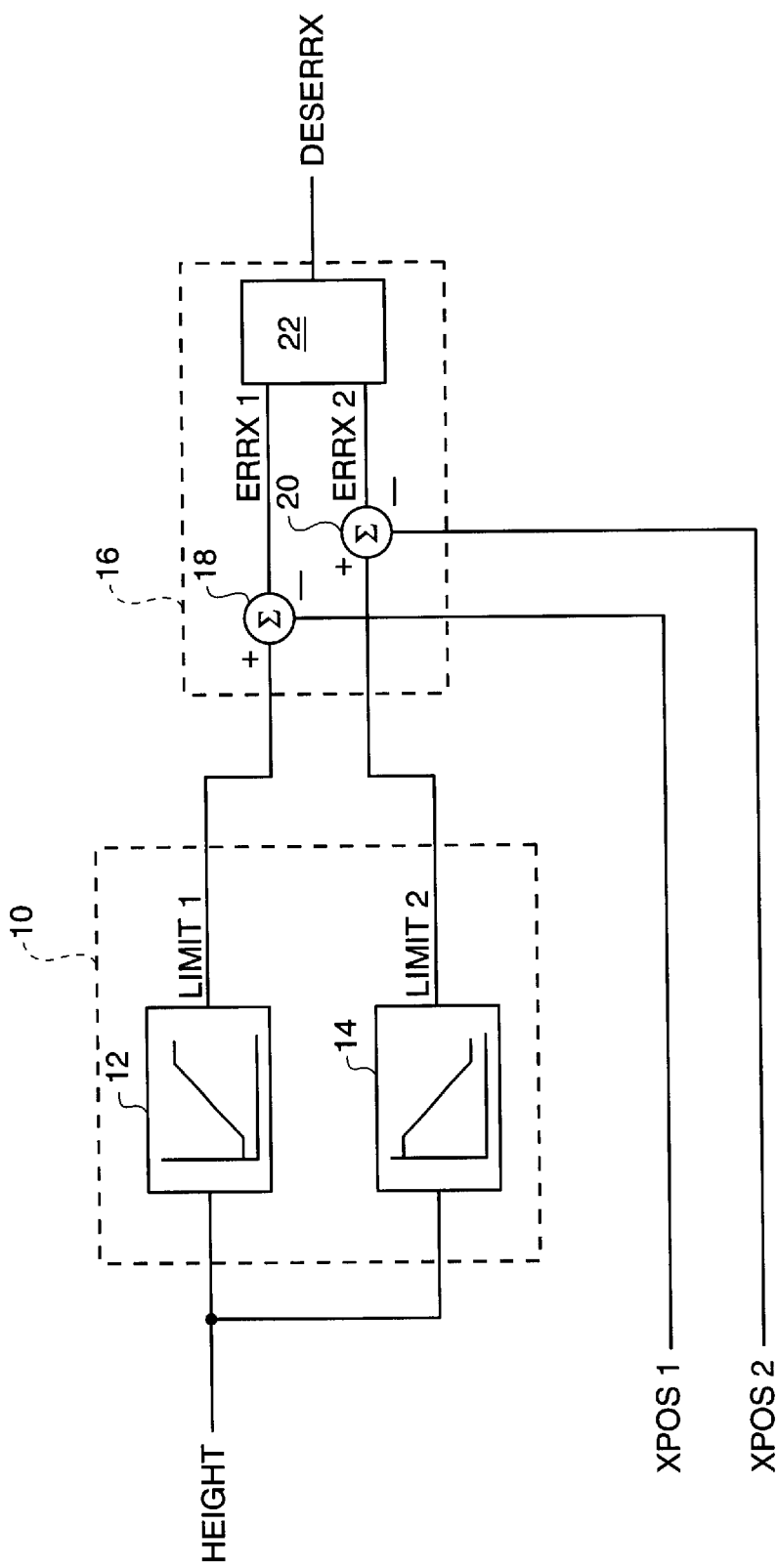
FIG. 1 is a functional block diagram of an apparatus according to one embodiment of the invention for determining respective limit positions of two members capable of movement along a first and second axes.

FIG. 1 is a functional block diagram of an apparatus 10 according to one embodiment of the invention for determining respective limit positions of two members (not shown) capable of movement along a first and second axes. The two members are typically linked for movement along both axes, and have the same position along the first axis, such as a y-axis, and generally the same relative movement, although not necessarily the same position, along the second axis, such as a x axis. Apparatus 10 receives an actual position ("HEIGHT") indicative of an actual position of one of the first and second members along the y-axis. Because the two members typically have the same position along the y-axis, the actual position HEIGHT may be indicative of an actual position of the either or both of the first and second members.

A first processing device 12 receives the actual y-axis position HEIGHT and determines and transmits a first member limit position LIMIT1 as a function of the y-axis position HEIGHT. In a preferred embodiment, the first member limit position LIMIT1 is proportional to the y-axis position HEIGHT, although in other embodiments it may be inversely proportional or have any of a variety of other mathematical relationships.

A second processing device 14 receives the actual y-axis position HEIGHT and determines and transmits a second member limit position LIMIT2 as a function of the y-axis position HEIGHT. In a preferred embodiment, the second member limit position LIMIT1 is inversely proportional to the y-axis position HEIGHT, although in other embodiments it may be proportional or have any of a variety of other mathematical relationships.

A third processing device 16 may be coupled with apparatus 10 to receive the first and second member limit positions LIMIT1, LIMIT2. The third processing device 16 also typically receives an actual position ("XPOS1") of the first member along the x-axis, and an actual position ("XPOS2") of the second member along the x-axis.

In one embodiment, the third processing device 16 includes a first summing device 18, a second summing device 20, and an error selector 22. The first summing device 18 determines and transmits a first difference, or error ("ERRX1"), between the actual position XPOS1 of the first member and the limit position LIMIT1 of the first member. The second summing device 20 determines and transmits a second difference, or error ("ERRX2"), between the actual position XPOS2 of the second member and the limit position LIMIT2 of the second member. Both the first and second summing devices 18, 20 may be implemented by any of a variety of appropriate ways known to those skilled in the art.

In one embodiment, the error selector 22 receives the errors ERRX1, ERRX2 and transmits a desired position error ("DESERRX") along the x-axis of at least one of the first and second members as a function of the errors ERRX1, ERRX2. In a preferred embodiment the desired position error DESERRX will be the first error ERRX1 when the first member is beyond the limit position LIMIT1 (e.g., when the first error is positive using the notation described below), and will be the second error ERRX2 when the second member is beyond the limit position LIMIT2 (e.g., when the second error is negative using the notation described below). If neither member is beyond its respective limit position, the desired position error DESERRX will be zero (e.g., when the first error ERRX1 is negative or zero and the second error ERRX2 is positive or zero). Other appropriate mathematical functions may also be selected to determine the desired position error DESERRX. The desired position error DESERRX may be used in a variety of appropriate ways known to those skilled in the art to control the position and velocity of the first and second members.

In another embodiment, the first and second error signals ERRX1, ERRX2 are multiplied by respective gains to yield two member limit velocities. Typically the member limit velocities are calculated to be smaller as the member approaches a limit position. The error selector 22 may also receive a third velocity that is generally a function of the desired position of the hitch. The error selector then transmits one of the member velocities using logic similar to that which is described above.

In one embodiment, the error selector 22 may also transmit no signal depending on the relationship between the member actual position and the limit positions.

Again, because the first and second members are typically linked, controlling the position of one of the members along the x-axis also controls the position of the other member along the x-axis. In one embodiment where the first and second members are not linked, the error selector 22 may be omitted. Thus, the error signal for the left member ERRX1 and the error signal for the right member ERRX2 would both be transmitted by the third processing device 16.

Figure 2:
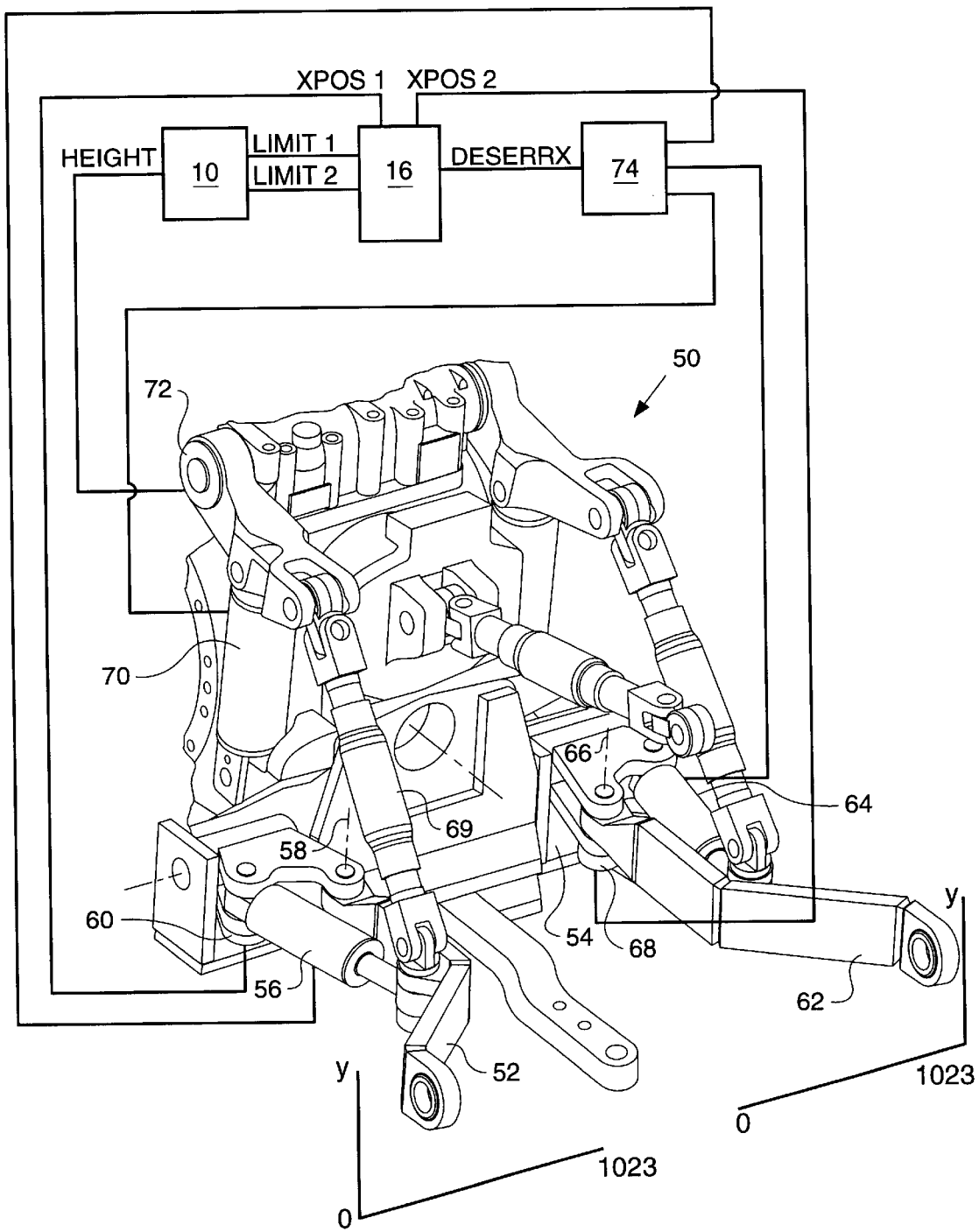
FIG. 2 is a three-point hitch according to one embodiment of the invention.

FIG. 2 is a three-point hitch 50 according to one embodiment of the invention. The three-point hitch 50 includes a first arm, such as a left arm 52, pivotally coupled with a base plate 54. A first cylinder 56 is also coupled with the left arm 52 and the base plate 54, and causes the left arm to pivot about a first pivot point 58. The left arm 52 has a predetermined range of movement along the x-axis, which is defined as 0 when fully to the left (when viewed head-on) and 1023 when fully to the right for sake of convenience. Other nomenclatures may also be used with an appropriate change in logic of the apparatus 10, as discussed below.

A first sensor 60 is coupled with the left arm 52 and transmits the actual position XPOS1 of the left arm 52 with respect to the predetermined range of movement along the x-axis by ways known to those skilled in the art. The first sensor 60 may be any of a variety of appropriate sensors known to those skilled in the art.

The three-point hitch 50 includes a second arm, such as a right arm 62, pivotally coupled with the base plate 54. A second cylinder 64 is also coupled with the right arm 62 and the base plate 54, and causes the right arm 62 to pivot about a second pivot point 66. The right arm 62 also has a predetermined range of movement similar to that which is discussed above.

In one embodiment, a second sensor 68 is coupled with the right arm 62 and transmits the actual position XPOS2 of the right arm 62 with respect to the predetermined range of movement along the x axis by ways known to those skilled in the art. The second sensor 68 may be any of a variety of appropriate sensors known to those skilled in the art.

The three-point hitch 50 also typically includes a mechanism, such as a third arm 69 and third cylinder 70 coupled with the base plate 54, for raising, by ways known to those skilled in the art, the left and right arms 52, 62. A third sensor 72 is coupled with the third cylinder 70 and transmits an actual position HEIGHT of the left and right arms 52, 62 along the y-axis by ways known to those skilled in the art.

The apparatus 10 is coupled with the first, second, and third sensors 60, 68, 72 to respectively receive their transmitted signals XPOS1, XPOS2, and HEIGHT. The apparatus 10 functions similarly to what is described above, and will not be repeated. The third processing device 16 is coupled with the apparatus 10 as described above, and transmits the desired position error DESERRX.

An actuating device, such as a hydraulic pump system 74 or an electric motor (not shown), is coupled with the first and second cylinders 56, 64. The hydraulic pump system 74 actuates the first and second cylinders 56, 64 as a function of the desired position error DESERRX by ways known to those skilled in the art.

In operation, the third sensor 72 detects and transmits the actual position HEIGHT of the left and right arms 52, 62. The apparatus 10 receives the actual position HEIGHT and transmits a left arm limit position LIMIT1 and a right arm limit position LIMIT2. Typically the left arm limit position LIMIT1 will increase in magnitude (i.e., be closer to center, the 1023 position) with an increasing actual position HEIGHT. Conversely, the right arm limit position LIMIT2 will decrease in magnitude (i.e., be closer to the center, the 0 position) with an increasing actual position HEIGHT.

The first and second sensors 60, 68 detect and transmit the actual positions XPOS1, XPOS2 of the left and right arms 52, 62 along the x-axis. The third processing device 16 is coupled with the first and second sensors 60, 68 to receive actual positions XPOS1, XPOS2 and is coupled with the apparatus 10 to receive the left and right arm limit positions LIMIT1, LIMIT2.

When the actual left arm position XPOS1 is not beyond the left arm limit position LIMIT1 (e.g., is not farther from center that the limit position LIMIT1, thus having a value greater than the left arm limit position LIMIT1), and the actual right arm position XPOS2 is not beyond the right arm limit position (e.g., is not farther from center that the limit position LIMIT2, thus having a value less than the left arm limit position LIMIT1), the desired position error DESERRX will be zero. When the actual left arm position XPOS1 is beyond the left arm limit position LIMIT1, the desired position error DESERRX will be the first error ERRX1. When the actual right arm position XPOS2 is beyond the right arm limit position LIMIT2, the desired position error DESERRX will be the second error ERRX2.

Typically, the left and right arm positions XPOS1, XPOS2 are symmetrical with respect to center and the left and right arms are linked. Thus, the above states for the desired position error DESERRX logic are not mutually exclusive.

Thus, as the hitch 50 raises the left and right arms 52, 62, thereby raising any implement coupled with a left and right arms 52, 62, the apparatus 10 and the third processing device 16 automatically maintain the left and right arms 52, 62 within a certain distance of center that is a function of the height of the hitch 50. Significantly, by appropriately defining the limit positions LIMIT1, LIMIT2 of the left and right arms as described above, the limit positions LIMIT1, LIMIT2 will ensure that the left and right arms, and therefore the implement will automatically center as the hitch 50 is raised. Further, limit positions LIMIT1, LIMIT2 may be selected so as to be closer to center then any sway blocks, thus preventing the left and right arms from contacting the sway blocks and causing unnecessary wear.

In one embodiment, the apparatus 10 and the third processing device 16 control a single arm. The portions of the apparatus 10 and the third processing device 16 that interact with the second arm as described above, as well as one of the two arm sensors, may be removed or ignored as appropriate. In operation with a single sensor, the single sensor value may be used for both the left and right arm positions XPOS1, XPOS2. Doing this generally requires a different map for the arm which does not have a sensor. For instance, if only a left arm position sensor is used, the right arm limit map should be changed such that the right arm limit position LIMIT2 is a function of the left arm position XPOS1, and not the right arm position XPOS2. Operating in this manner typically requires the left and right arms to be couples such that as one arm moves the other arm is also moved. Additionally, if the relationship between the relative motions of the right arm with respect to the left arm is changed, the right arm limit map should also be changed, such as by implementing a calibration process. Changing the distance between where the left and right arms attach to the implement is one example of a change that would likely require modification of the right arm limit map in the above example.

FIG. 3 is a functional block diagram and side view of a work machine 100 according to one embodiment of the invention. The work machine 100 includes a frame 102 and an engine 104 coupled with a frame 102. The engine 104 produces a locomotive force by ways known to those skilled in the art. At least one ground engaging traction device, such as a track 106 or wheel (not shown), is coupled with the engine 104 to receive the locomotive force. The track 106 moves relative to the frame 102 as a function of the locomotive force by ways known to those skilled in the art. A control input device, such as a joystick or lever 108, is coupled with a frame 102, and provides a commanded position ("COMPOSY") along the y-axis for the third cylinder 70. The apparatus 10, the third processing device 16, and the hitch 50 are coupled with a frame 102, and function similarly to what is described above. The hydraulic pump system 74, in addition to functioning as described above, receives the commanded position COMPOSY from the lever 108 and actuates the third cylinder 70 as a function of the commanded position COMPOSY by ways known to those skilled in the art. Thus, the left and right arms 52, 62 may be raised and lowered on command from the lever 108, and will stay within the defined limit positions LIMIT1, LIMIT2.

From the foregoing it will be appreciated that, although specific embodiment of the invention have been described herein for purposes of illustration, various modifications may be made without the meeting from the spirit and scope of the invention. For example, the arms may translate instead of or in addition to pivoting, or the sensors may read the extension of the cylinders to determine the position of the left and right arms. In addition, the invention may be implemented in hardware or software, or a combination of them both. Accordingly, the invention is not limited except as by the appended claims.

What is claimed is:

1. An apparatus for determining respective limit positions of two members, each of the two members capable of movement along a first and a second axes, comprising:

a first processing device operable to receive one of a first member actual position indicative of a first member actual position along the first axis and a second member actual position indicative of a second member actual position along the first axis, the first processing device operable to determine and transmit a first member limit position along the second axis as a function of the one of the first member actual position and the second member actual position; and a second processing device operable to receive one of the first member actual position indicative of a first member actual position along a first axis and the second member actual position indicative of a second member actual position along the first axis, the second processing device operable to determine and transmit a second member limit position along the second axis as a function of the one of the first member actual position and the second member actual position.

2. The apparatus of claim 1 wherein the first member limit position along the second axis is inversely proportional to the one of the first and second member actual positions along the first axis and the second member limit position along the second axis is proportional to the one of the first and second member actual positions along the first axis.

3. The apparatus of claim 1 wherein the first member limit position along the second axis is proportional to the one of the first and second member actual positions along the first axis and the second member limit position along the second axis is inversely proportional to the one of the first and second member actual positions along the first axis.

4. The apparatus of claim 1 wherein the first and second member limit positions along the second axis respectively comprise horizontal limit positions and the first and second member actual positions along the first axis respectively comprise a height of the first and second members.

5. The apparatus of claim 1, further comprising:

a third processing device operable to receive a first and second member actual positions along the second axis and coupled with the first and second processing devices to receive the first and second member limit position along the second axis, the second processing device operable to determine and transmit an error position along the second axis as a function of the first and second member actual positions along the second axis, and the first and second member limit positions along the second axis.

6. The apparatus of claim 5 wherein the error position along the second axis:

comprises the difference between the first member actual position along the second axis and the first member desired position along the second axis when the first member actual position along the second axis has a first predetermined relationship with the first member limit position along the second axis;

comprises the difference between the second member actual position along the second axis and the second member desired position along the second axis when the second member actual position along the second axis has a second predetermined relationship with the second member limit position along the second axis; and otherwise comprises zero.

7. The apparatus of claim 6 wherein:

the first member actual position along the second axis has the first predetermined relationship with the first member limit position along the second axis when the first member actual position along the second axis less than the first member limit position along the second axis; and the second member actual position along the second axis has the second predetermined relationship with the second member limit position along the second axis when the second member actual position along the second axis is greater than the second member limit position along the second axis.

8. The apparatus of claim 6 wherein:

the first member actual position along the second axis has the first predetermined relationship with the first member limit position along the second axis when the first member actual position along the second axis is greater than the first member limit position along the second axis; and the second member actual position along the second axis has the second predetermined relationship with the second member limit position along the second axis when the second member actual position along the second axis is less than the second member limit position along the second axis.

9. An apparatus for determining a position of a first member capable of movement in at least two axes, comprising:
a first processing device operable to receive one of a first member actual position along a first axis and a second member actual position along the first axis, the first processing device operable to determine and transmit a first member limit position along a second axis as a function of the one of the first member actual position and the second member actual position along the first axis.

10. The apparatus of claim 9 wherein the first member limit position is inversely proportional to the first member actual position.

11. The apparatus of claim 9 wherein the first member limit position is proportional to the first member actual position.

12. The apparatus of claim 9 wherein the first member limit positions for a predetermined range of first member actual positions approximately form a straight line.

13. The apparatus of claim 9 wherein the first axis is an approximately vertical axis and the second axis is an approximately horizontal axis.

14. The apparatus of claim 9 wherein the first member limit position comprises a horizontal limit position and the first member actual position along the first axis comprises a member height.

15. An apparatus for controlling a horizontal position of an arm on a hitch, the arm being capable of horizontal and vertical motion, comprising:
a first processing device operable to receive an arm vertical position and to determine and transmit an arm horizontal limit position as a function of the arm vertical position.

16. A work machine, comprising:
a frame;
an engine coupled with the frame and operable to provide a locomotive force;
a ground engaging traction device coupled with the frame and with the engine to receive the locomotive force, the ground engaging traction device operable to move relative to the frame as a function of the locomotive force;
a hitch assembly coupled with the frame and having a first, second, and third arms capable of movement in a first and second axis;
a control input coupled with the frame, the control input providing a desired hitch assembly position indicative of a desired position of the first and second arms along the first axis;
a first sensor coupled with the first arm, the first sensor operable to transmit a first arm actual position along the second axis;
a second sensor coupled with the second arm, the second sensor operable to transmit a second arm actual position along the second axis;
a third sensor coupled with at least one of the first, second, and third arms, the third sensor operable to determine and transmit an arm actual position along the first axis;
an apparatus for determining respective limit positions of the first and second arms, comprising:
a first processing device coupled with the third sensor to receive the arm actual position along the first axis, the first processing device operable to determine and transmit a first arm limit position along the second axis as a function of the arm actual position along the first axis; and
a second processing device coupled with the third sensor to receive the arm actual position along a first axis, the second processing device operable to determine and transmit a second arm limit position along a second axis as a function of the arm actual position along the first axis;
a third processing device coupled with the first and second sensors to receive the first and second arm actual positions along the second axis and coupled with the first and second processing devices to receive the first and second arm limit positions along the second axis, the second processing device operable to determine and transmit an error position along the second axis as a function of the first and second member actual positions along the second axis, and the first and second member limit positions along the second axis;
a hydraulic pump system coupled with the third processing device to receive the error position, and operable to transmit a fluid flow as a function of the error position; and
an actuator coupled with the hydraulic pump system, the actuator operable to move at least one of the first and second arms along the second axis as a function of the fluid flow.

17. The apparatus of claim 16 wherein the first axis comprises an approximately vertical axis and the second axis comprises an approximately horizontal axis.

18. The apparatus of claim 16 wherein the error position along the second axis comprises:
the difference between the first arm actual position along the second axis and the first arm desired position along the second axis when the first arm actual position along the second axis has a first predetermined relationship with the first arm limit position along the second axis;
the difference between the second arm actual position along the second axis and the second arm desired position along the second axis when the second arm actual position along the second axis has a second predetermined relationship with the second arm limit position along the second axis; and
otherwise comprises zero.

19. The apparatus of claim 18 wherein:
the first arm actual position along the second axis has the first predetermined relationship with the first arm limit position along the second axis when the first arm actual position is beyond the first arm limit position; and
the second arm actual position along the second axis has the second predetermined relationship with the second arm limit position along the second axis when the second arm actual position is beyond the second arm limit position.

20. A method for determining a position of a first member capable of movement in at least two axes, comprising:
determining one of a first member actual position along a first axis and a second member actual position along the first axis; and
determining a first member limit position along a second axis as a function of the one of the first and second member actual positions along the first axis.

21. The method of claim 20 wherein the first member limit position is inversely proportional to the one of the first and second member actual positions.

22. The method of claim 20 wherein the first member limit position is proportional to the one of the first and second member actual positions.

23. An apparatus for controlling a horizontal position of an arm on a hitch, the arm being capable of horizontal and vertical motion, comprising:

a processing device operable to receive a first signal indicative of an arm vertical position and to transmit a second signal indicative of an arm horizontal limit position as a function of the first signal.

* * * * *